(12) United States Patent
Chiou et al.

(10) Patent No.: US 8,031,676 B2
(45) Date of Patent: Oct. 4, 2011

(54) SYSTEM FOR CONSTRUCTING A MOBILITY MODEL FOR USE IN MOBILITY MANAGEMENT IN A WIRELESS COMMUNICATION SYSTEM AND METHOD THEREOF

(75) Inventors: Ta-gang Chiou, Cambridge, MA (US); Constantin Chiscanu, Cambridge, MA (US); Ching-Jui Hsiao, Cambridge, MA (US)

(73) Assignee: Groundhog Technologies Inc. (TW)

( * ) Notice: Subject to any disclaimer, the term of this patent is extended or adjusted under 35 U.S.C. 154(b) by 0 days.

(21) Appl. No.: 12/655,800

(22) Filed: Jan. 7, 2010

(65) Prior Publication Data
US 2010/0118725 A1    May 13, 2010

Related U.S. Application Data

(63) Continuation of application No. 10/369,678, filed on Feb. 21, 2003, now abandoned.

(51) Int. Cl.
*H04W 4/00* (2009.01)

(52) U.S. Cl. ........ 370/331; 370/328; 370/329; 370/330; 455/436

(58) Field of Classification Search .......... None
See application file for complete search history.

(56) References Cited

U.S. PATENT DOCUMENTS

| | | | |
|---|---|---|---|
| 5,887,156 A * | 3/1999 | Subramanian et al. | 703/2 |
| 5,974,318 A * | 10/1999 | Satarasinghe | 455/436 |
| 6,044,273 A * | 3/2000 | Tekinay | 455/446 |
| 6,091,953 A | 7/2000 | Ho et al. | |
| 6,111,857 A * | 8/2000 | Soliman et al. | 370/254 |
| H1896 H | 10/2000 | Hoffpauir et al. | |
| 6,128,500 A * | 10/2000 | Raghavan et al. | 455/453 |
| 6,137,783 A | 10/2000 | Sallberg | |
| 6,160,804 A | 12/2000 | Ahmed et al. | |
| 6,385,454 B1 | 5/2002 | Bahl et al. | |
| 6,625,153 B1 | 9/2003 | Liu | |
| 6,631,263 B1 * | 10/2003 | Corkery | 455/436 |
| 7,054,635 B1 * | 5/2006 | Ritzen et al. | 455/444 |
| 7,493,120 B2 * | 2/2009 | Kim et al. | 455/436 |
| 2002/0082032 A1 | 6/2002 | Hunzinger | |
| 2003/0186693 A1 | 10/2003 | Shafran et al. | |
| 2004/0122956 A1 | 6/2004 | Myers et al. | |
| 2004/0266442 A1 * | 12/2004 | Flanagan et al. | 455/445 |

OTHER PUBLICATIONS

I. Demirkol, C. Ersoy, M. U. Caglayan and H. Delic, "Location Area Planning in Cellular Networks Using Simulated Annealing", Proceedings of IEEE Infocom, The Conference on Computer Communications 2001, Anchorage, Alaska, Apr. 22-26, 2001, pp. 13-20.

Vincent Wong and Victor C.M. Leung, "Location Management for Next Generation Personal Communication Networks," IEEE Network, vol. 14, No. 5, Sep./Oct. 2000,pp. 18-24.

G. Wan and E. Lin, "Cost reduction in location management using semi-realtime movement information", ACM-Baltzer J. Wireless Networks, vol. 5, No. 4, 1999, pp. 245-256.

(Continued)

*Primary Examiner* — Donald Mills

(57) ABSTRACT

A method for constructing a mobility model for use in optimizing mobility management in a wireless communication system is disclosed, which comprises steps of collecting a plurality of network traffic statistic data of a plurality of desired items, wherein the desired items are related to the behavior of a plurality of subscribers of the wireless communication system; constructing the mobility model according to the network traffic statistic data, wherein the mobility model is for modeling the mobility behavior of the subscribers; and optimizing mobility management according to the mobility model.

14 Claims, 5 Drawing Sheets

OTHER PUBLICATIONS

S. Tabbane. Location Management Methods for Third- Generation Mobile Systems. IEEE communication magazine, vol. 35 No. 8., Aug. 1997, pp. 72-84.

B. W. Kernighan and S. Lin. An efficient heuristic procedure for partitioning graphs. The Bell system technical journal, 49(1):291-307, 1970.

C. Fiduccia, R. Matteyses, "A Linear-time Heuristic for Improving Network Partitions", Proc. of DAC, 1982, pp. 175-181.

H. Xie, S. Tabbane and D. J. Goodman, "Dynamic location area management and performance analysis", in Proc. 42nd IEEE Vehicular Technology Conf., May 1993, pp. 536-539.

P. G. Escalle, V. Casares, et al., "Reducing Location Update and Paging Costs in a PCS Network", IEEE Transactions on Wireless Communications, vol. 1, No. 1, Jan. 2002, pp. 200-209.

S. K. Sen, A. Bhattacharya, and S. K. Das, "A Selective Location Update Strategy for PCS Users", ACM/Baltzer Journal on Wireless Networks, No. 5, 1999, pp. 313-326.

* cited by examiner

SYSTEM FOR CONSTRUCTING A MOBILITY MODEL FOR USE IN MOBILITY MANAGEMENT IN A WIRELESS COMMUNICATION SYSTEM AND METHOD THEREOF

Related Cases

This is a continuation of application Ser. No. 10/369,678, filed Feb.21, 2003, now abandoned.

BACKGROUND OF THE INVENTION

1. Field of the Invention

The invention relates in general to a system for use in optimizing mobility management in a wireless communication system and the method thereof, and more particularly to a system for constructing a mobility model for use in optimizing mobility management in a wireless communication system and the method thereof.

2. Description of the Related Art

In order to satisfy the convenience, efficiency requirement of the modern people, wireless communication systems have been developed rapidly. All kinds of wireless communication devices, such as cell phones or mobile stations, are widely used in the world.

FIG. 1 shows the rough architecture of a sample wireless communication network. Using a cellular system as an example, the geographical coverage area of the wireless communication system is partitioned into cells, served by base stations. Each mobile station of an individual subscriber is connected to the wireless network via the base stations. The coverage of cells differs greatly according to various factors, such as the power of the base station, the geographical features (e.g. mountains, valleys, rivers) within the cells, the area (e.g. city, suburb) of the cells, the architecture (e.g. tall buildings, railroad, highway) within the cells, etc. One or more cells are respectively combined to a location area (LA), also known as Paging Area, Routing Area, or Registration Area in some systems. Basically, a location area is a region in which subscribers can move arbitrarily without requiring a location area update, which incurs central database update (e.g. in a Home Location Register or Visitor Location Register) of the location area information that is utilized for describing the current location area of subscribers. The size of a location area is defined to cover the demands raised by traffic density and flow, population density and subscriber mobility, etc.

Mobility management enables the wireless network to find the locations of mobile stations so as to deliver incoming calls, messages, or packets to mobile stations. Mobility management includes location update, paging, and other operations, such as handover, that are related to the location or mobility of subscribers. Since subscribers are free to move within the service area of the system, the system can only maintain the approximate location of each subscriber. When a connection needs to be established for a particular subscriber, the system has to determine the subscriber's exact location, to the accuracy of a cell, within the location area. When a subscriber leaves the border of the specific location area, the mobile station must register its new location area through signaling the location area information to the system. This procedure is called updating (location area update), or location registration. The updating procedure is for informing the system about the current location area of the subscriber. Besides location area update, there are also other types of location update that will be described later in this specification. When the system tries to deliver a phone call or message to a subscriber by first finding the location of the specific subscriber, the system can search among the cells within the current location area of the mobile station. This procedure is called paging. The paging procedure is for determining the exact location, to the accuracy of a cell, of the subscriber.

Because there are many tradeoffs and high complexity involved, the parameters involved in mobility management are difficult to define in an optimal manner. For example, how to define the scope, including size and the border cells, of location areas so as to decrease the overall cost of the wireless communication system is an important issues for optimizing mobility management. Since a location area is composed of cells, the size and the border of each location area can be defined by deciding which cells are collected into the location area. If the size of the location area is too small, mobile stations cross the location area frequently. As a result, the mobile stations perform location area update frequently and the location accuracy is to a smaller region, the system can thus have lower paging load. However, the system must waste its resources by performing frequent location area update, and the mobile station must waste its power transmitting the location area update signal. On the other hand, if the size of the location area is too large, mobile stations cross the border of the location areas rarely and do not perform location area update frequently. However, a large coverage area has to be paged when a call or a message arrives, which waste resource of the system. In addition, the border of the location area is also an important factor in defining the scope of the location area. If the border of the location area is set parallel to and close to major highways, or in heavy traffic regions where population and mobility behavior of the subscribers are high, the subscribers may result in much location area update. Furthermore, the subscribers may cross the border of a specific location area back and forth, thereby causing much location area update, if the border of the location area is not properly set. As a result, the system wastes its resources by processing frequent location area update procedure, and the mobile stations waste power transmitting the location area update signal.

Various conventional mobility models, such as fluid flow model, gravity mode, random walk model, etc, are presented as a basis for studying issues resulted from subscribers' behavior. For further discussion, please refer to "Location Management for Next-Generation Personal Communications Networks" (pp. 18~pp. 24, IEEE Network, September/October 2000) incorporated herein by reference. Those conventional mobility models are more used for studying issues resulted from subscribers' behavior, than optimizing mobility management for a live wireless communication system. They lack enough precision and accuracy to practically optimize mobility management due to the following reasons.

First, each of these conventional models is based on certain intuitions and assumptions and might not correctly model realistic use of a live system. Taking the fluid flow model as an example, the fluid flow model is used for simulating the aggregate mobility behavior of the fluid in the flow or any other systems which the aggregate mobility behavior of the components in the system is like the fluid in the flow. It is obvious that the feature of the fluid flow is different from the subscribers of the wireless communication system in a crowded city. Therefore, the fitness of applying fluid flow model to model the aggregate mobility behavior of the subscribers in a crowded city is questionable. In the same manner, the fitness of other conventional mobility models is questionable for widespread use in optimizing mobility management in a live wireless communication system, since the real model is usually different from a hypothetical one.

Second, since the subscribers' mobility behavior in a wireless communication system is complicated, some of the conventional mobility models are oversimplified that they only specifically put stress on certain factors and significantly simplify the complexity of the mobility behavior of the subscribers. Therefore, those conventional mobility models lack enough accuracy to reflect the real mobility behavior of subscribers for optimization mobility management.

Third, since data of real wireless communication systems are difficult to acquire, most of the conventional mobility models are proposed or built upon simulated data, not a plurality of data obtained from real wireless communication systems. Due to the above-described reasons, the reliance and the accuracy of the simulation result of those mobility models are questionable if they are applied to optimizing mobility management.

In the present time, there is no optimal method or algorithm which is proven to be able to minimize the overall cost of mobility management based on realistic mobility model of subscribers. From time to time, mobility management parameters need to be redefined. For example, from time to time the scope of location area needs to be redefined, such as splitting it into two new location areas when equipment of the old location area reaches its paging capacity. In practice, mobility management parameters are defined according to the subjective experience and rough judgment of the wireless operators. It is obvious that this kind of methods have difficulty minimizing the overall cost of mobility management. Although there are optimization algorithms that can be used, as will be introduced and incorporated later in this specification, without a realistic mobility model their practicability and accuracy are highly limited. The conventional approaches either has difficulty to find the optimal strategy out of numerous possible configurations, or do not concisely take into account the mobility characteristics of the entire system. This results in extra or unbalanced resource consumption, and leads operators to more capital expenditure on hardware expansion as mobility management traffic grows.

SUMMARY OF THE INVENTION

It is therefore an objective of the present invention to provide a system for constructing a mobility model for use in optimizing mobility management in a wireless communication system and a method thereof so as to achieve the objectives, which the mobility model is constructed according to network traffic statistic data collected from the wireless communication system to realistically reflect the mobility behavior of the subscribers. In this manner when optimizing mobility management according to the mobility model of the present invention, the overall cost can be reduced. Besides, the extra or unbalanced resource consumption, and the unnecessary capital expenditure on hardware expansion as mobility management traffic grows can be avoided.

According to the objectives of the present invention, a system is provided for constructing a mobility model for use in optimizing mobility management in a wireless communication system. The system comprises a processor and a storage medium. The processor further includes a mechanism for collecting a plurality of network traffic statistic data of a plurality of desired items, wherein the desired items are related to the behavior of a plurality of subscribers of the wireless communication system, a mechanism for constructing the mobility model according to the network traffic statistic data, wherein the mobility model is for modeling the mobility behavior of the subscribers, and a mechanism for optimizing mobility management according to the mobility model. The storage medium coupling to the processor is for storing the network traffic statistic data, data of the mobility model, and data of optimizing mobility management.

A method is also provided for constructing a mobility model for use in optimizing mobility management in a wireless communication system. The method comprises collecting a plurality of network traffic statistic data of a plurality of desired items, wherein the desired items are related to the behavior of a plurality of subscribers of the wireless communication system; constructing the mobility model according to the network traffic statistic data, wherein the mobility model is for modeling the mobility behavior of the subscribers; and optimizing mobility management according to the mobility model.

Other objects, features, and advantages of the invention will become apparent from the following detailed description of the preferred but non-limiting embodiments. The following description is made with reference to the accompanying drawings.

DETAILED DESCRIPTION OF PREFERRED EMBODIMENTS

The feature of the disclosed method of the present invention is to construct the mobility model of the wireless communication system according to network traffic statistic data collected from the wireless communication system to realistically reflect the mobility behavior of the subscribers first, and then optimize the mobility management related parameters according to the mobility model of the present invention.

The conventional mobility models are either derived from other models that are based on certain intuitions and assumptions not suitable for many practical situations, or only specifically put stress on certain factors to simplify the complexity of the mobility behavior of the subscribers. Therefore, those mobility models are not able to accurately reflect the real mobility behavior of subscribers for optimizing mobility management. In the present invention, a mobility model construction method is provided in order to construct a mobility model based on the network traffic statistic data collected from different parts of the real wireless communication system. The network traffic statistic data may reflect different aspects and metrics of subscribers' behavior of the wireless network. The mobility model constructed according to the network traffic statistic data combines all the different aspects and metrics of subscribers' behavior, and realistically reflects the mobility behavior of the subscribers in the system. In addition, the mobility model of the present invention needs not be set up through oversimplifying the complexity of the wireless communication system. It can be utilized to provide the objective optimal solution to minimize the overall cost of mobility management when defining or redefining mobility management related parameters, such as the scope of a location area. The capital expenditure of the system operators can thus be reduced.

Figure 1:
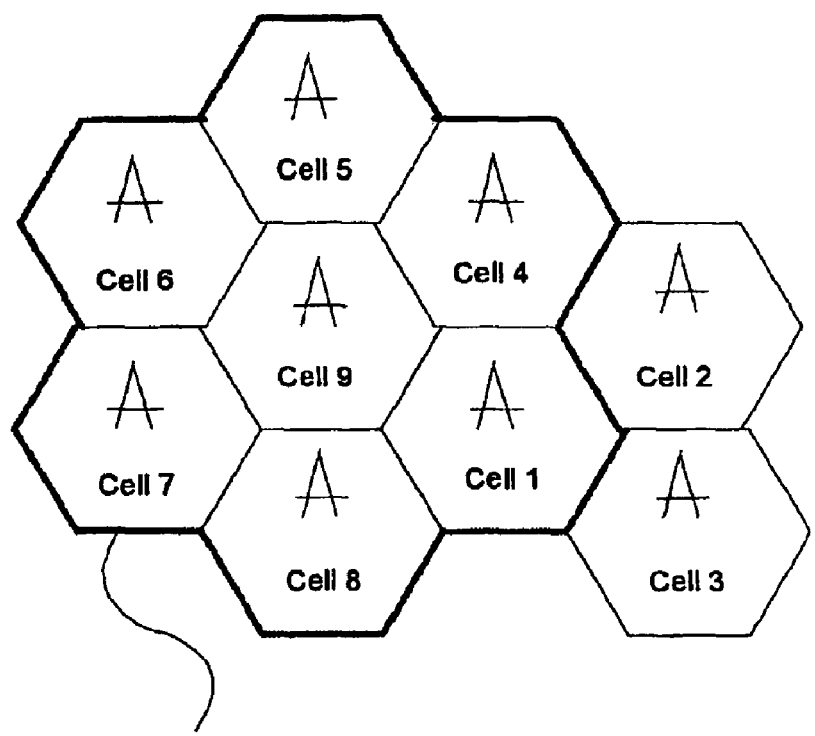
FIG. 1 shows a sample rough architecture of a wireless communication system.
Figure 2:
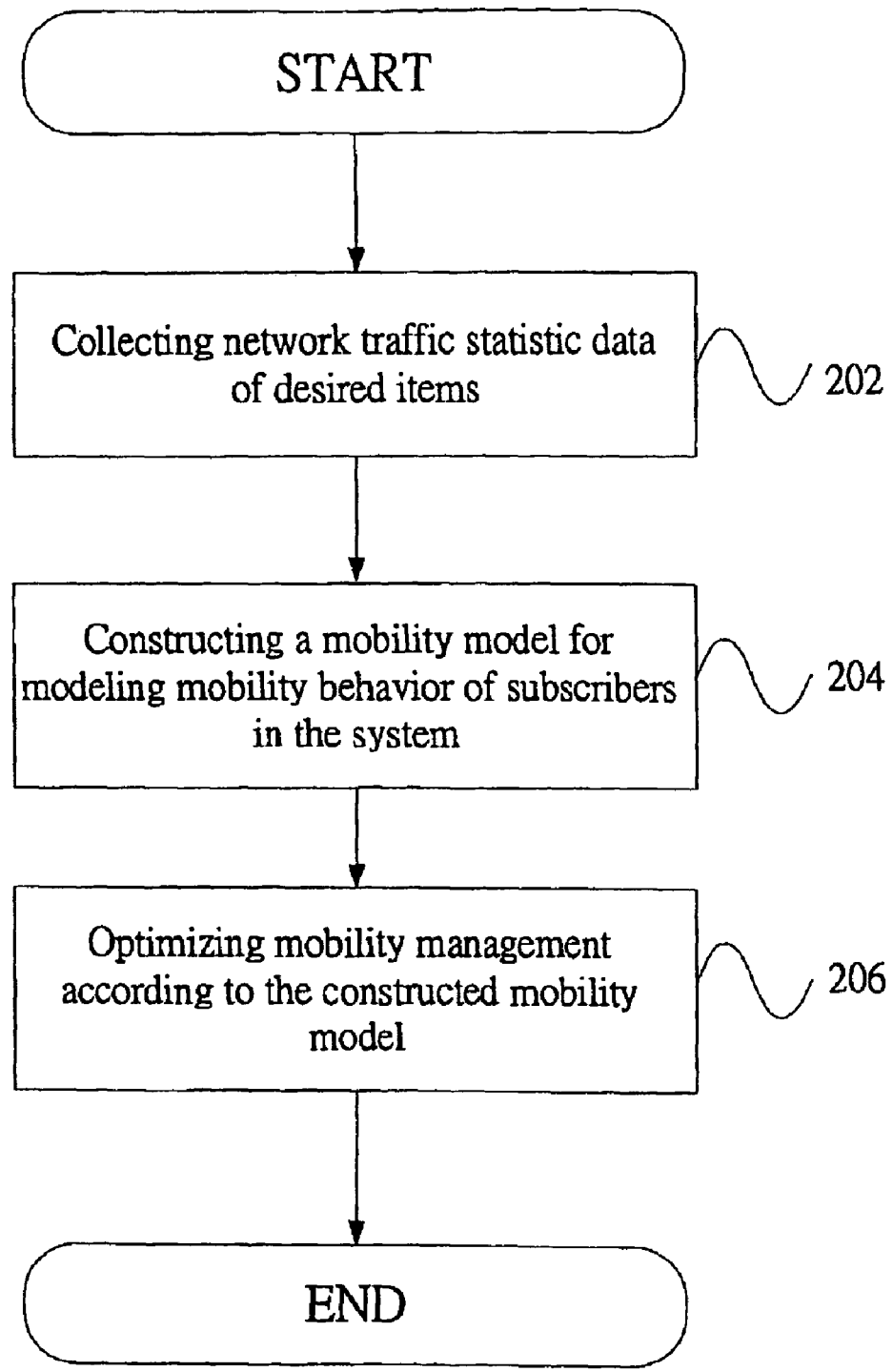
FIG. 2 illustrates the flow chart of the mobility model construction method for use in optimizing mobility management according to the preferred embodiment of the present invention.

FIG. 2 illustrates the flow chart of the mobility model construction method according to the preferred embodiment of the present invention. The mobility model construction method according to the preferred embodiment of the present invention comprises the following steps. In the beginning, step 202 of collecting network traffic statistic data of desired items is executed. The network traffic statistic data can be generated by different devices of the system, such as MSC, VLR of the Network Switching Subsystem (NSS) and/or the BSC of the Base Station Subsystem (BSS). The network traffic statistic data can, but not necessarily, be collected through the Operations Support Subsystem (OSS) or Operation and Maintenance Center (OMC) of the wireless communication system.

In the preferred embodiment of the present invention, the desired items include: Location Update or Total Location Update (LU, which includes different types of location update such as location area update), Periodic Location Update (PLU), Attaching Location Update (ATA); Sum of Mobility Rate ($\Sigma D$); Handover (HO), which may be directional handover ($HO_{ji}$) or handover due to a specific cause (e.g. Power Budget Handover, $PBGT\ HO_i$); calls, which may be Mobile Terminating Call (MTC) or Mobile Originating Call (MOC); ratio of mobility behavior causing handover ($A_i$), ratio of calls causing handover ($B_i$); SMS (Short Message Service) counter; Paging (PN), et cetera. Each of the desired items may help reflect a specific aspect of mobility behavior of the subscribers. In a preferred embodiment, the Location Update (LU) and Handover (HO) are the necessary items. Other items are optional items for implementing the better mode of the present invention. Detail of each item will be described in the following specification.

The step of collecting network traffic statistic data of desired items can further include a step of preprocessing the network traffic statistic data if needed. Since the network traffic statistic data are generated by different devices of the system, the format may not be coherent. The pre-processing step can be executed to unify the format of the network traffic statistic data so as to apply the statistic data to construct the mobility model. For example, the statistic data of some desired items may be hourly based and that of other items may be daily based. The time unit of the statistic data of all desired items can be unified through executing the pre-processing step. In addition, the corresponding geographical area of the statistics of all desired items can be determined and unified as well through executing the pre-processing step.

Then, step 204 of constructing a mobility model for modeling mobility behavior of subscribers in the system is executed. The mobility model implies knowledge such as how many subscribers move from one cell to another cell at different time. To understand the construction of mobility model, analogy in computer vision may be helpful: With photos of a certain object from several different angles, a computer with advanced computer vision algorithms is able to construct the 3D model of the object based on these 2D photos. Similarly, the construction of mobility model is based upon network traffic statistic data containing different aspects and metrics of subscribers' behavior from different parts of the wireless network. As mentioned above, the contributing information sources may include time series of counters and success ratio of location update, handover, paging, calls, etc. By itself, each of these observations reveals only a slice of the complete state of the subscribers' mobility behavior. The present invention interweaves the data gathered from these disparate information sources to construct the mobility model of subscribers. One equation, simultaneous equations, inequations, or nonlinear mathematics (e.g. neural network) corresponding to the network traffic statistic data can be solved to generate the mobility model, which is an accurate spatial-temporal model of subscribers' mobility behavior, over time and between every pair of cells.

Figure 3:
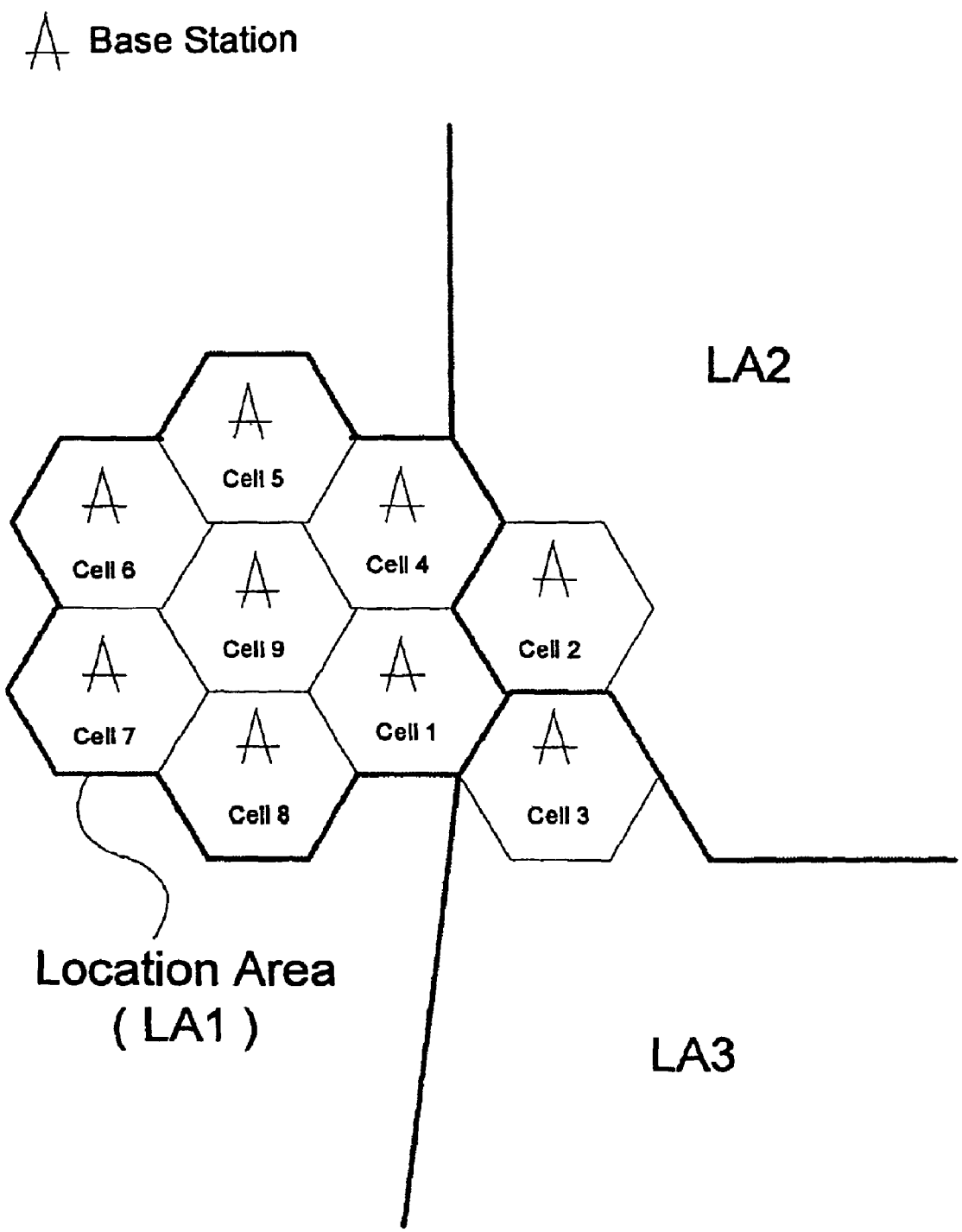
FIG. 3 shows a diagram used to explain the way to implement mobility model construction method of the present invention.

In the preferred embodiment, in order to construct the mobility model, the behavior of the subscribers corresponding to each cell is determined first. Please refer to FIG. 3, which shows a diagram used to explain the way to implement mobility model construction method of the present invention. Taking $CELL_1$ as an example, it belongs to the location area LA1 and is a border cell of LA1. $CELL_1$ is neighbor to $CELL_2$ and $CELL_3$, which belongs to the location area LA2 and LA3 respectively, as shown in FIG. 3.

In the preferred embodiment, when constructing the mobility model of the system, the mobility behavior of the subscribers in each border cell of the location area are determined first, then the mobility behavior of the subscribers in the inner cells, which are not border cells, of the location area are determined.

It should be noted that not only when the subscriber crosses the border of the specific location area to another location area will the mobile station execute the location update procedure. For example, when a subscriber has stayed in the specific location area over a specific period of time without sending information to the wireless network, or when the subscriber turns on the mobile station in the specific location area, the mobile station may execute the location update procedure as well.

The Location Update ($LU_1$) of $CELL_1$ represents the total number of location update recorded in $CELL_1$ during a predetermined time period. In the preferred embodiment, the magnitude of Location Update ($LU_i$) can be determined by the following items. (a). Sum of Mobility Rate ($\Sigma D_{ji}$) which represents the total number of the subscribers which move from the neighbor cells (e.g. $CELL_2$ and $CELL_3$) belonging to another location area (e.g. LA2 and LA3 respectively) into $CELL_i$ (e.g. $CELL_1$). (b). Periodic Location Update ($PLU_i$) which represents the Periodic Location Update triggered by mobile stations that have stayed in $CELL_i$ over a specific period of time without sending information to the network. (c). Attaching Location Update ($ATA_i$) which represents the times of mobile stations being turned on in $CELL_i$ during the predetermined time period. The relation among Sum of Mobility Rate ($\Sigma D_{ji}$), Periodic Location Update ($PLU_i$), and Attaching Location Update ($ATA_i$) selected from the set of network traffic data can be shown as the mobility equation (Eq. 1) as follows:

$$LU_i = f_i(\Sigma_{j, cell\ j\ is\ adjacent\ to\ cell\ i, and\ cell\ j\ belongs\ to\ a\ different\ LA\ than\ cell\ i} D_{ji}, PLU_i, ATA_i) \quad (Eq.1)$$

A reasonable $f_i$ can be chosen according to practice. For example, an applicable form of Eq. 1 and $f_i$ is:

$$LU_i = \Sigma_{j, cell\ j\ is\ adjacent\ to\ cell\ i, and\ cell\ j\ belongs\ to\ a\ different\ LA\ than\ cell\ i} D_{ji} + PLU_i + ATA_i \quad (Eq.1')$$

It should be noted that Sum of Mobility Rate ($\Sigma D_{ji}$) represents the total number of mobile stations moving into $CELL_i$ from cells belonging to a different location area from that of $CELL_i$. Sum of Mobility Rate ($\Sigma D_{ji}$) is a necessary term in the right hand side of equation (Eq. 1), and other terms in the right hand side may be skipped in certain embodiments, in exchange for faster processing while lower accuracy. If terms in the right hand side besides Sum of Mobility Rate ($\Sigma D_{ji}$) are skipped, Location Update (LU) are considered to be close to Location Area Update described in the Description of the Related Art of the present specification. In addition, all other situations than the above-disclosed situations which the mobile station will execute location update can be put into consideration when constructing the mobility model.

When a mobile station moves from the coverage of CELL 1 to that of CELL 2, the connection between the mobile station and the network system must be changed from via the base station of CELL 1 to that of CELL 2. The process is called handover. There are different causes of handover, such as power budget, quality, interference, and level of signals being better in the new cell. Note that not only the mobility behavior of subscribers but also other causes can cause handover. According to our experience, Power Budget Handover (PBGT HO) is usually more frequently caused by mobility behavior of subscribers than handover of other causes. Nevertheless, a substantial portion of handover represents the times of mobile stations moving from other neighbor cells, such as from $CELL_j$ to $CELL_i$. In a typical wireless communication system, there can be different types of handover statistic data. For instance Directional Handover ($HO_{ji}$) statistic data record the times of subscribers moving from $CELL_j$ to $CELL_i$, with knowledge of both the source cell ($CELL_j$) and destination cell ($CELL_i$). In certain wireless communication systems, Power Budget Handover (PBGT $HO_i$) statistic data may record the total number of handover caused by power budget, from all neighboring cells into the destination cell ($CELL_i$), without differentiating the source cell. In some other wireless communication systems, Power Budget Handover (PBGT $HO_{ij}$) statistic data may contain more specific directional information by recording the number of handover caused by power budget, from the source cell ($CELL_i$) to the destination cell ($CELL_j$).

The magnitude of handover can relate to factors such as: (a). Mobility Rate ($D_{ji}$) which represents the times of the mobile stations moving from $CELL_j$ to $CELL_i$; (b). Call Rate (e.g. $C_i$ or $C_j$), which is a function of Mobile Terminating Call (e.g. $MTC_i$ or $MTC_j$) and Mobile Originating Call (e.g. $MOC_i$ or $MOC_j$). Mobile Terminating Call (e.g. $MTC_i$ or $MTC_j$) represents the times of subscribers located within a cell (e.g. $CELL_i$ or $CELL_j$) receiving calls; Mobility Originating Call (e.g. $MOC_i$ or $MOC_j$) represents the times of subscribers located within a cell (e.g. $CELL_i$ or $CELL_j$) calling out.

In one embodiment, the relation among Directional Handover ($HO_{ji}$), Mobility Rate ($D_{ji}$), Call Rate ($C_{ij}$), Mobile Terminating Call ($MTC_i$ or $MTC_j$), Mobility Originating Call ($MOC_i$ or $MOC_j$) can be defined by the Mobility Equations (Eq2 and Eq3) as follows:

$$HO_{ji}=f_h(D_{ji},C_{ij}) \tag{Eq2}$$

$$C_{ij}=f_c(MTC_i,MOC_i,MTC_j,MOC_j) \tag{Eq3}$$

Eq2 and $f_h$, as well as Eq3 and $f_c$, can further be implemented with a reasonable selection of linear or nonlinear equations. For instance, one of the simplest forms applicable is:

$$HO_{ji}=D_{ji}*A_i+C_{ij}*B_i \tag{Eq2'}$$

$$C_{ij}=MTC_i \tag{Eq3'}$$

$A_i$ is the ratio of mobility behavior causing handover, and $B_i$ is the ratio of calls causing handover. The parameters $A_i$ and $B_i$, as well as $D_{ji}$, of border cells can be derived by applying corresponding network statistic data (e.g. $LU_i$, $PLU_i$, $ATA_i$, $MTC_i$, $MOC_i$, $MTC_j$, $MOC_j$, $HO_{ji}$ of border cells) to the equations (Eq1', Eq2', and Eq3') and see what $A_i$ and $B_i$ generates the best result (e.g. with minimum least square error.) Therefore, the mobility behavior of the subscribers corresponding to $CELL_i$ that are border cells can be determined. There can be different $A_i$ and $E_i$ for different time, when the $CELL_i$ is having different loading, or between different pairs of cells, given enough statistic data for calculation. Therefore, $A_i$ and $B_i$ can be further specified as $A_{it}$ and $B_{it}$, $A_{il}$ and $B_{il}$, or $A_{ij}$ and $B_{ij}$. In addition, all other situations than the above-disclosed situations which the mobile station will execute handover or whose counter is related to that of handover can be put into consideration when construction the mobility model.

Referring to FIG. 3 again, the mobility behavior of the subscribers corresponding to all border cells of LA1, such as $CELL_1$, $CELL_4$, $CELL_5$, $CELL_6$, $CELL_7$, and $CELL_8$ can be calculated in the same manner. Since $A_i$ of all border cells of LA1 are available, the $A_i$ of inner cells of LA1, such as $CELL_9$, can be calculated by that of the neighboring cells according to the following Mobility Equation Eq4:

$$A_9=f_a(A_1,A_2,A_3,A_4,A_5,A_6,A_7,A_8) \tag{Eq4}$$

Since $B_i$ of all border cells of LA1 are available, the $B_i$ of inner cells of LA1, such as $CELL_9$, can be calculated by that of the neighboring cells according to the following Mobility Equation Eq5:

$$B_9=f_b(B_1,B_2,B_3,B_4,B_5,B_6,B_7,B_8) \tag{Eq5}$$

Eq4 and $f_a$, as well as Eq5 and $f_b$, can further be implemented with a reasonable selection of linear or nonlinear equations. For instance, one of the simplest forms applicable is:

$$A_9=(A_1*HO_{19}+A_2*HO_{29}+A_3*HO_{39}+A_4*HO_{49}+A_5*HO_{59}+A_6*HO_{69}+A_7*HO_{79}+A_8*HO_{89})/(HO_{19}+HO_{29}+HO_{39}+HO_{49}+HO_{59}+HO_{69}+HO_{79}+HO_{89}) \tag{Eq4'}$$

$$B_9=(B_1*C_{19}+B_2*C_{29}+B_3*C_{39}+B_4*C_{49}+B_5*C_{59}+B_6*C_{69}+B_7*C_{79}+B_8*C_{89})/(C_{19}+C_{29}+C_{39}+C_{49}+C_{59}+C_{69}+C_{79}+C_{89}) \tag{Eq5'}$$

Another more accurate but computationally intensive example of implementation of Eq4 and $f_a$ is:

$$A_9=(A_1*D_{19}+A_2*D_{29}+A_3*D_{39}+A_4*D_{49}+A_5*D_{59}+A_6*D_{69}+A_7*D_{79}+A_8*D_{89})/(D_{19}+D_{29}+D_{39}+D_{49}+D_{59}+D_{69}+D_{79}+D_{89}) \tag{Eq4''}$$

The simultaneous equations of Eq1~Eq5 of cells in the location area can thus be listed, and $A_i$, $B_i$, $D_{ji}$ can be solved with standard statistical methods given enough data points of network statistic data. The mobility behavior of the subscribers can thus be determined. The mobility model based on various network traffic statistic data collected from the real network system to model the mobility behaviors of the subscribers in the real network system can thus be constructed.

Every single cell in the location area contributes to the total paging number of the location area ($PN_{L1}$). Taking $CELL_1$ of LA1 as an example, Paging Rate ($PR_1$) of $CELL_1$ represents the number of paging of $PN_{L1}$ contributed by paging subscribers in $CELL_1$. $PR_1$ can be calculated according to the mobility Equation (Eq6) as follows:

$$PR_1=(MTC_1/MTC_{L1})*PN_{L1} \tag{Eq6}$$

$MTC_1$ represents the times subscribers, located within $CELL_1$, receiving phone calls. $MTC_{L1}$ represents the times of subscribers, located within $LA_1$, receiving phone calls.

Therefore, $MTC_{L1} = \Sigma MTC_i$, for all CELL i belonging to LA1. Paging Rate of others cells can thus be calculated in the same manner.

It should be noted that all other situations than the above-disclosed situations which the mobile station will execute paging can be put into consideration when constructing the mobility model.

As another example, mobility model can also be constructed starting with the following equations: i,j are indices to CELLs, $$LU_i = (\Sigma_{j, cell\ j\ is\ adjacent\ to\ cell\ i, and\ cell\ j\ belongs\ to\ a\ different\ LA\ than\ cell\ i} D_{ji}) * K_i \quad (Eq7)$$

$$HO_{ij} = D_{ij} * A_i + C_i * B_i \quad (Eq8)$$

$$PBGT\ HO_i = (\Sigma_{j, cell\ j\ is\ adjacent\ to\ cell\ i} D_{ij}) * E_i + C_i * F_i \quad (Eq9)$$

$$2 * C_i = MTC_i + MOC_i \quad (Eq10)$$

Eq. 7 is similar to Eq. 1', and Eq. 8 is similar to Eq. 2', except certain terms are ignored because they are small in magnitude relatively. Among all different types of handover, Eq. 9 utilizes statistic data of certain handover due to a specific cause which may most likely be resulted from subscribers' mobility behavior. For example, PBGT HO, which stands for power budget handover, is handover due to the cause of power budget. In our experience, PBGT HO is more likely to be resulted from subscribers' mobility behavior, as compared to handover caused by quality, interference, or level. In some wireless communication systems, PBGT $HO_i$ cannot differentiate the source cells, and in some other wireless communication systems, PBGT $HO_{ij}$ can differentiate the source cells. In this embodiment, PBGT $HO_i$, which cannot differentiate the source cells, is used as an example. Because PBGT $HO_i$ can be caused by mobility behavior of subscribers, the first term in Eq. 9 is proportional to the times of subscribers moving into CELL. However, PBGT $HO_i$ can also result from random noises or interferences that decrease the power level of signals such that a handover is needed to maintain the signal level, hence the second term in Eq. 9 reflects the fact that a portion of the calls will suffer from a decrease in signal level that results in a power budget handover.

The mobility model construction can also be extended with first applying a step of smoothing the call rate $C_i$. This step is to smoothen the noises in the data to get the underlying pattern. Therefore, instead of Eq. 10, we have the following:

$$C_i = [(MTC_i + MOC_i)/2 + \lambda * \Sigma_{j, cell\ j\ is\ adjacent\ to\ cell\ i} (MTC_j + MOT_j)/2]/(1 + \lambda * \Sigma_{j, cell\ j\ is\ adjacent\ to\ cell\ i}) \quad (Eq11)$$

where $\lambda$ is a smoothing factor. $\lambda$ can be assumed a value or obtained by optimization based on cross-validation, which is to be described.

The mobility model construction can further be extended by obtaining a preliminary estimate of the mobility model. In this example, $C_i$ is substituted back into Eq8 to obtain a preliminary estimate of the mobility model. In the preferred embodiment, the value of $B_i$ is obtained by doing a regression analysis with $HO_{ij}$ being the regressand and $C_i$ being the regressor. $B_i$ is in general i dependent. In one embodiment, $B_i$ is assumed to be constant over all cells but it can also be obtained by doing regression analysis on subsets of the cells and optimized using cross-validation. A preliminary estimate of $D_{ij}$ can thus be calculated:

$$D_{ij} * A_i = HO_{ij} - C_i * B_i \quad (Eq12)$$

Again, $A_i$ can be assumed a value or obtained by optimization based on cross-validation.

The next step is to use this preliminary $D_{ij}$ to compute $\Sigma_j D_{ji}$ and $\Sigma_j D_{ij}$ in Eq7 and Eq9. Similar to the case of $B_i$, coefficients $K_i$, $E_i$, and $F_i$ are calculated by doing linear regression analyses on Eq7 and Eq9 with $\Sigma_j D_{ji}$, $\Sigma_j D_{ij}$, and $C_i$ being the regressors, and $LU_i$ and PBGT $HO_i$ being the regressands. The regressions analyses also yield two root-mean-square errors $\sigma B_i$ and $\sigma E_i$ for Eq7 and Eq9 respectively. Finally, all the data are put together to compute the mobility model:

$$Dfinal_{ij} = [D_{ij} + (B_i/\sigma B_i * \Sigma_j B_i * \Sigma_j D_{ji}/\text{number of cells adjacent to cell } i \text{ and residing in a different LA than cell } i) + (E_i/\sigma E_i * \Sigma_j D_{ij}/\text{number of cells adjacent to cell } i)]/(1 + B_i/\sigma B_i + E_i/\sigma E_i) \quad (Eq13)$$

The accuracy of a model can be verified by cross-validation. The constructed mobility model $D_{ij}$ can be substituted into the right-hand side of Eq7, and we can compare the resulting number with the available data $LU_i$. This comparison yields a measure of the accuracy of the model. The values of $\lambda$ and $A_i$ can be optimized based on this measure. Modifications and combinations of the above two methods of mobility model construction can be done to yield various mobility models. For example, a preliminary mobility model $D_{ij}$ can be computed using the first method instead, and then the final estimator for $D_{ij}$ can be obtained by doing regression analyses on Eq7 and Eq9 and evaluating Eq13. Cross-validation can be carried out over all the cells or on local cells to indicate the degree of validity for each of the mobility model. Therefore, a most accurate mobility model can be found for each pair of cells.

After mobility model is constructed, step 206 of optimizing mobility management according to the constructed mobility model is executed. Since the mobility model is constructed based on the practical mobility behavior of the subscribers in the real world, optimizing mobility management based on the mobility model can minimize the overall cost of mobility management.

Figure 4:
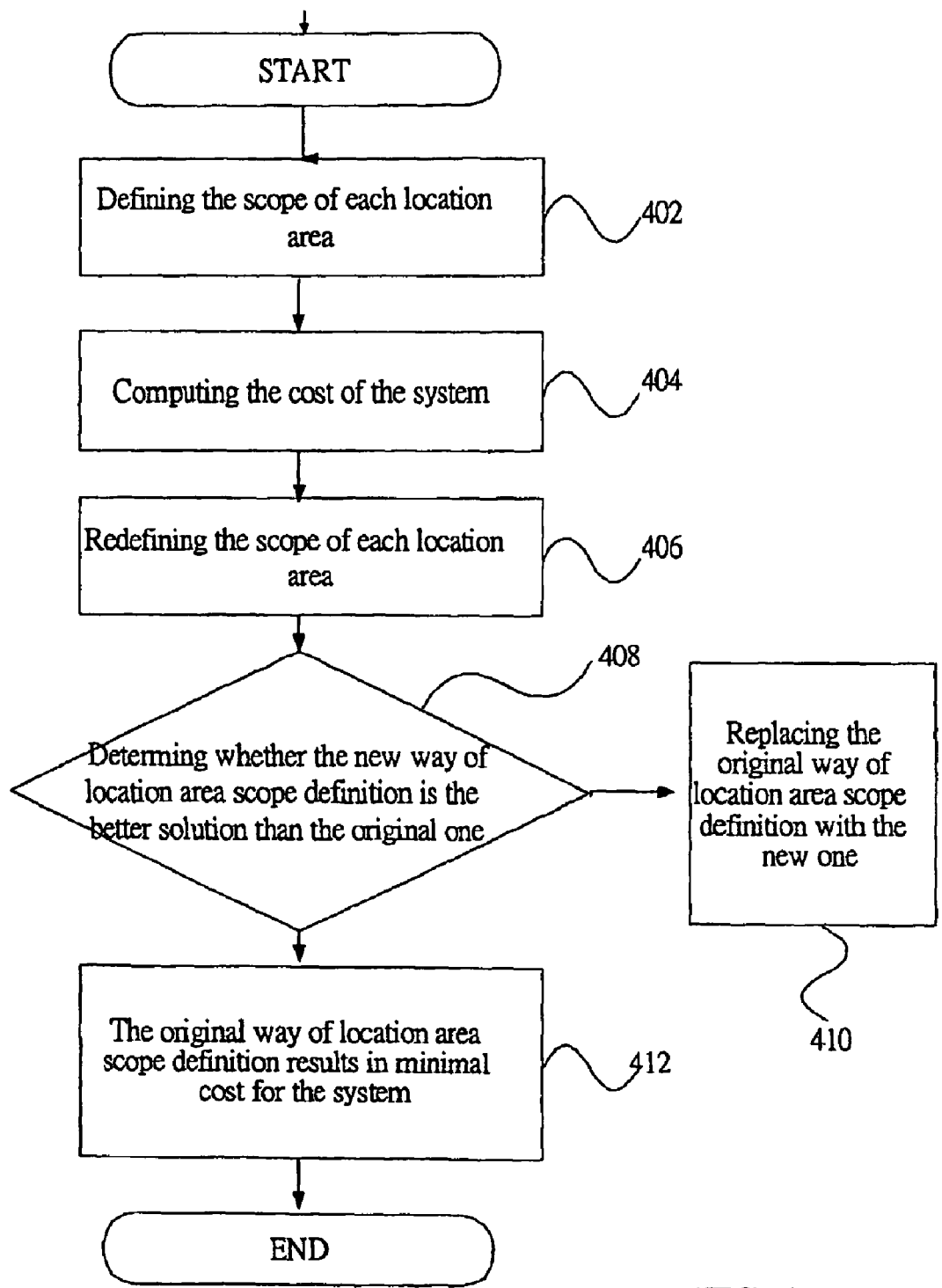
FIG. 4 illustrates the flow chart of optimizing a mobility management parameter according to the preferred embodiment of the present invention.

FIG. 4 illustrates the flow chart of optimizing mobility management parameters according to the preferred embodiment of the present invention. In this embodiment, the K-L (Kernighan Lin) algorithm is used for determining the scope of location area. It should be noted that the parameters of mobility management are not limited to the scope of the location area. Other parameters of mobility management that can be optimized include, but are not limited to, number and scope of location areas; value of different timers such as circuit-switch/packet-switch Periodic Location Update timer and RRC Connection Release timer, and Inactivity timer; network topology and connectivity of different network elements such as MSC, BSC, and BTS; paging parameters such as paging duration, paging retry times, paging scope, sequence of paging; method of handover (e.g. hard, soft, or softer handover), hysteresis factor of handover; coverage of cells, et cetera. In addition, the algorithm used for adjusting parameters of mobility management is not limited to the K-L algorithm. Other applicable algorithms include, but are not limited to, greedy algorithm, F-M (Fiduccia Mattheyses) algorithm, Genetic Algorithm, and simulated annealing algorithm. For information on K-L algorithm, please refer to "An Efficient Heuristic Procedure for Partitioning Graphs" (The Bell system technical journal, 49(1):291-307, 1970). For information on greedy algorithm, please refer to "Introduction to Algorithms: A Creative Approach, chapter 7" (pp. 210–pp. 211, Addison-Wesley Publishing Company, 1989). For information on F-M algorithm, please refer to "A Linear-Time Heuristic for Improving Network Partitions" (Proc. of DAC, 1982). For information on Genetic Algorithm, please refer to "A Genetic Algorithm For Optimizing Multiple Part Placement To Reduce Build Time" (Proceedings of the Fifth International Conference on Rapid Prototyping, Dayton, Ohio, June 1994). For information on simulated annealing algorithm, please refer to "Location Area Planning in Cellular Networks Using Simulated Annealing" (Proceedings of IEEE Infocom, The Conference on Computer Communications 2001, Anchorage, Ak., Apr. 22-26, 2001). The above-mentioned publications are incorporated herein by reference. All other optimization algorithms can be used as well.

In the beginning, step 402 of defining the scope of each location area is executed. The number of location areas and the scope of each location area can be determined according to the number of cells and the network's rules/constraints, such as the paging capacity and channel capacity. For example, when collecting the cells into one location area, it should be noted that the sum of Paging Rate (PR) of all cells cannot exceed the paging capacity of the location area. The Paging Rate (PR) of each cell can be determined according to the mobility equation (Eq6) disclosed above. Many rules/constraints, such as capacity limit of various equipments, RF planning experience (i.e. rule-of-thumb), geographical conditions, and so on, are taken into account at this step.

Then, step 404 of computing the overall costs of the system network is executed. Since the mobility model of the present invention can model the mobility behavior of all subscribers, the overall costs of mobility management of the system can be determined. The mobility model of the present invention can be determined according to the mobility equations disclosed above. It should be noted that in the practical wireless communication network system, the cost of every single paging, location update, and handover operation might not be the same for different network elements. When executing mobility management, we take into account the difference in cost overhead of operations involving different network elements, such as the RF costs of the Base Station Subsystem, A-interface loading, and computation costs of the Network Switching Subsystem. For instance, inter-VLR and intra-VLR location area updating results in different costs for certain network elements, and inter-BSC handover and intra-BSC handover contribute to different costs for MSC. Therefore, not only the number of location update and paging, but also the cost of every single operation, are put into consideration when computing the overall cost of the system.

Then, in one embodiment, step 406 of redefining the scope of location areas according to K-L algorithm is executed. Taking $CELL_1$ as an example, $CELL_1$ belongs to LA1 in the original network system, as shown in FIG. 3. When executing the K-L algorithm, the location area of $CELL_1$ is changed to LA2 and the location area of one cell belonging to LA2, such as $CELL_2$ is changed to LA1 and then computing the overall cost of the system. In the same manner, all other possible ways to exchange the location area of every two cells in different location areas are executed and the overall costs of the resulting system are evaluated. When redefining the location area scope formed by executing K-L algorithm, the overall cost of the system may be either increased or decreased. The desired scope of location areas is the one for which the overall cost of the system is minimal compared to the overall cost of other ways of location area scope definition.

Then, step 408 of determining whether the new way of location area scope definition is the better solution than the original way of location area scope definition is executed. Step 408 can be executed through comparing the system's overall cost of the new location area scope form to that of the original location area scope form. If the system's overall cost of the new location area scope form is lower than that of the original location area scope form, step 410 of replacing the original way of location area scope definition with the new one is executed then the algorithm returns to step 406 to execute the K-L algorithm again. If the system's overall cost of any other location area scope configurations are all higher than that of the original location area scope configuration, step 412 is executed that the original way of location area scope definition is proven to be the best solution to mobility management through executing the K-L algorithm.

In this example, cell is the smallest unit for the scope of location area. Practically, the smallest unit can be different according to different systems. For example, some operators may prefer to use a Base Station, a Node-B, or an Access Point as the smallest unit for the scope of location area.

Besides K-L algorithm, other optimization algorithms, such as F-M (Fiduccia, C. M. and R. M. Mattheyses) algorithm, greedy algorithm, genetic algorithm, simulated annealing, etc, can be executed as well, when optimizing mobility management of the wireless communication system. Since the mobility model of the present invention is constructed based on the actual mobility behavior of all subscribers, not the subjective experience of the system operators, the result of mobility management through executing the method disclosed in the specification can be proven to lower the overall cost of the system. In this manner, the capital expenditure and hardware expansion of the system operators can thus be decreased.

The method disclosed in the present invention is for use in all different kinds of wireless network, including not only the second generation wireless networks such as GSM, CDMA, and PDC, but also more advanced systems such as 2.5G systems like GPRS and EDGE, 3G systems like WCDMA, CDMA2000, and TD-SCDMA, and other wireless communication systems such as PHS and Wireless LAN/IPv6 networks. The terms used in different systems may be different but the concept is similar. For example, the concept of location area of GSM is similar to the routine area of packet-switched systems, zone and paging area of PDC and PHS, as well as UTRAN Registration Area of WCDMA. The concept of the network topology and connectivity of different network elements such as NSS, MSC, BSC, BSS, BTS, A-Interface in GSM system is similar to Core Network, SGSN/GGSN, RNS, RNC, Node-B, $I_u$PS-Interface in WCDMA packet-switched system, or Core Network, WRT, ELU, Radio Network, Cell Station (CS), WRT-ELU interface in PHS system. Therefore, the method disclosed in the present invention can be applied to other kinds of wireless communication systems as well.

Figure 5:
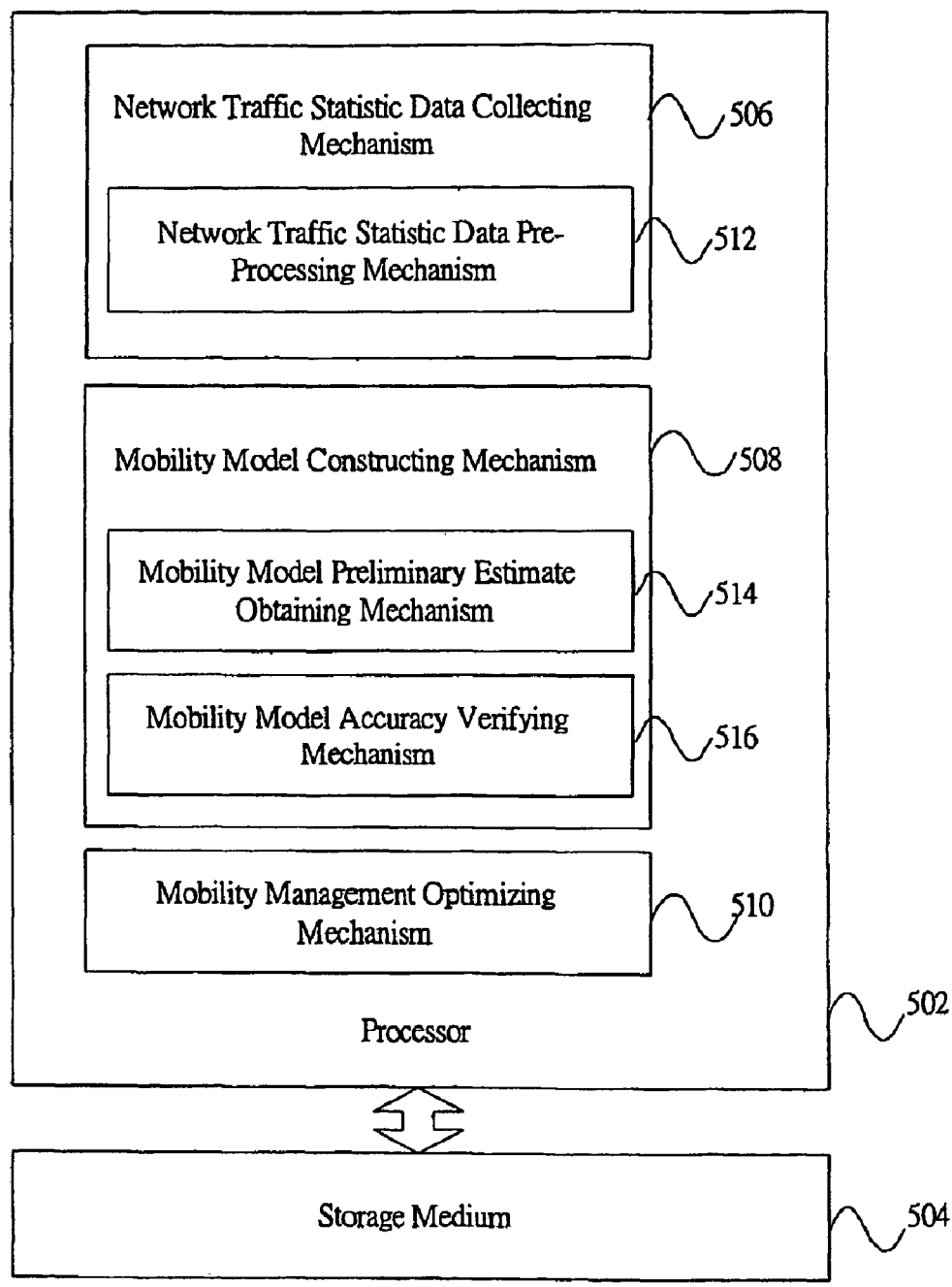
FIG. 5 illustrates the system for executing the mobility model construction method for use in optimizing mobility management according to the preferred embodiment of the present invention.

FIG. 5 illustrates the system for executing the mobility model construction method for use in optimizing mobility management according to the preferred embodiment of the present invention. The system includes a processor 502 and a storage medium 504. The processor 502 further includes a mechanism 506 for collecting a plurality of network traffic statistic data, a mechanism 508 for constructing the mobility model according to the network traffic statistic data, and a mechanism 510 for optimizing mobility management according to the mobility model. In addition, the mechanism 506 for collecting network traffic statistic data can further include a mechanism 512 for pre-processing the network traffic statistic data if needed. The mechanism 508 for constructing mobility model can further include a mechanism 514 for obtaining the preliminary estimate of the mobility model, and a mechanism 516 for verifying the accuracy of the mobility model. The operations of these mechanisms are disclosed in the above specification. In addition, each of the above-disclosed mechanisms can be implemented in the form of either a hardware circuit or a software program.

The storage medium 504 coupling to the processor is for storing the network traffic statistic data, data of the mobility model, and data of optimizing mobility management. The storage medium 504 can be any kind of storage device used in computer system.

While the invention has been described by way of example and in terms of the preferred embodiment, it is to be understood that the invention is not limited to the disclosed embodiment. On the contrary, it is intended to cover various modifications and similar arrangements and procedures, and the scope of the appended claims therefore should be accorded the broadest interpretation so as to encompass all such modifications and similar arrangements and procedures.

What is claimed this:

1. A method for a constructing a mobility model for optimizing a wireless communication system, wherein the wireless communication system includes a plurality of location areas, each of the location areas includes a plurality of border cells and at least an inner cell, and each border cell and each inner cell has a first parameter representing a ratio of mobility behavior causing handover, the method comprising:
    a processor collecting a plurality of network traffic statistic data of a plurality of items, wherein the items include handover (HO) between any two neighboring cells, and location update (LU) of each of a plurality of mobile stations of each border cell;
    the processor estimating the first parameter, which represents a ratio of mobility behavior causing handover, of each border cell according to the handover from each first cell to the border cell and the location update of the border cell, wherein the first cell is neighboring to the border cell and belongs to a different location area than the border cell; and
    the processor estimating a mobility rate from a neighboring cell of each cell to the cell according to the handover from the neighboring cell to the cell and the first parameter of the cell.

2. The method of claim 1, wherein if the plurality of cells comprises at least an inner cell, the method further comprises:
    determining a first equation for each cell according to the first parameters of the cell and each neighboring cell of the cell;
    estimating the first parameter of each inner cell according to the first equations.

3. The method of claim 2, wherein the items further include at least one of mobile terminating call (MTC) and mobile originating call (MOC) of each cell.

4. The method of claim 3, wherein each border cell and each inner cell has a second parameter representing a ratio of calls causing handover, wherein both the first and second parameters of the border cell are estimated according to the handover from each first cell to the border cell, the location update of the border cell, and a call rate of at least one of the border cell and the neighboring cell of the border cell, wherein the call rate is estimated according to at least one of the MTC and the MOC of at least one of the border cell and the neighboring cell of the border cell.

5. The method of claim 4, wherein the mobility rate from a neighboring cell of each cell to the cell is estimated further according to the second parameter of the cell and the call rate of at least one of the cell and the neighboring cell of the cell.

6. The method of claim 5, wherein the mobility rate from a neighboring cell of each cell to the cell is estimated according to a quotient of a first difference and the first parameter of the cell, wherein the first difference equals the handover from the neighboring cell to the cell minus a product of the second parameter of the cell and the call rate of at least one of the cell and the neighboring cell of the cell.

7. The method of claim 4, further comprising:
    determining a second equation for each cell according to the second parameters of the cell and each neighboring cell of the cell; and
    estimating the second parameter of each inner cell according to the second equations.

8. The method of claim 7, wherein the second equation for each cell is determined further according to the call rate of at least one of the cell and the neighboring cell of the cell.

9. The method of claim 4, wherein the call rate is smoothened according to a smoothing factor.

10. The method of claim 2, wherein the first equation for each cell is determined further according to the handover from each neighboring cell of the cell to the cell.

11. The method of claim 2, wherein the first equation for each cell is determined further according to the mobility rate from each neighboring cell of the cell to the cell.

12. The method of claim 2, further comprising:
    verifying accuracy of the estimated mobility rate from a neighboring cell of each cell to the cell according to the location update of the cell and the estimated mobility rate from each second cell to the cell, wherein the second cell is neighboring to the cell and belongs to a different location area than the cell.

13. The method of claim 2, further comprising:
    adjusting a plurality of parameters of mobility management in the wireless communication system according to the estimated first and second mobility rates.

14. The method of claim 13, wherein the parameters of mobility management include at least one of the following: the scope of each location area, the scope of each serving area of the wireless communication system, the magnitude of a plurality of timers, network topology and connectivity of different network elements, and paging parameters.

* * * * *